(12) United States Patent
Zielinski et al.

(10) Patent No.: US 8,059,751 B2
(45) Date of Patent: Nov. 15, 2011

(54) FREQUENCY DEPENDENT PHASE ROTATION PRIOR TO MAPPING IN AN OFDM TRANSMITTER

(75) Inventors: Ernst Zielinski, Dortmund (DE); Ludwig Schwoerer, Hattingen (DE)

(73) Assignee: Nokia Corporation, Espoo (FI)

( * ) Notice: Subject to any disclaimer, the term of this patent is extended or adjusted under 35 U.S.C. 154(b) by 951 days.

(21) Appl. No.: 12/069,239

(22) Filed: Feb. 8, 2008

(65) Prior Publication Data

US 2009/0202007 A1 Aug. 13, 2009

(51) Int. Cl.
 *H04L 27/36* (2006.01)
 *H04L 5/12* (2006.01)
 *H04L 23/02* (2006.01)
(52) U.S. Cl. ........................ 375/298; 375/261
(58) Field of Classification Search .................. 375/260, 375/261, 295, 298; 370/210, 480
See application file for complete search history.

(56) References Cited

U.S. PATENT DOCUMENTS

| | | | |
|---|---|---|---|
| 6,687,307 B1 | 2/2004 | Anikhindi et al. | 375/260 |
| 2004/0120413 A1 | 6/2004 | Park et al. | 375/260 |
| 2004/0151110 A1 | 8/2004 | Mazzoni et al. | 370/210 |
| 2005/0047325 A1 | 3/2005 | Singh et al. | 370/480 |
| 2005/0220203 A1* | 10/2005 | Ojard | 375/261 |

FOREIGN PATENT DOCUMENTS

WO  WO-2007/123340 A2  11/2007

OTHER PUBLICATIONS

"Technical Specification Group Radio Access Network; Physical layer aspects for evolved Universal Terrestrial Radio Access (UTRA) (Release 7)", 3GPP TR 25.814 V7.1.0 (Sep. 2006), 13 pgs.
"Technical Specification Group Radio Access Network; Radio Link Timing Adjustment (Release 5)", 3GPP TR 25.878 V5.1.0 (Jun. 2002), pp. 1-22.

* cited by examiner

*Primary Examiner* — Betsy Deppe
(74) *Attorney, Agent, or Firm* — Harrington & Smith, LLC (57) ABSTRACT

An input bit stream is phase rotated by reversing bit pairs and inverting bits. The manipulated bit stream is mapped to a symbol and the mapped symbol is converted to the time domain such that an output of the time domain conversion is an ordered set of N samples that allow efficient cyclic prefix insertion without rotation at the symbol level. A first portion of the set of samples is stored in a buffer, and the complete set of samples is output followed by the buffered first portion of the set of samples for transmission. The set of samples can be $N_{IFFT}$ samples of an OFDM symbol and the first portion can be $N_{CP}$ samples that make up the cyclic prefix CP. Re-ordering the bits can be done by swapping bit pairs and inverting one of the swapped pairs, or by trivial (1, −1, −j) phase rotation. The buffer is ¼ the length of prior art OFDM buffers and CP-related processing delays are significantly reduced.

24 Claims, 8 Drawing Sheets

FIG.7 BIT VECTOR MANIPULATION ACCORDING TO ROTATION FACTORS FOR QPSK:

| 1 | −j | −1 | j |
|---|---|---|---|
| b₁ → b₁<br>b₀ → b₀ | b₁ ⤫ b₁ (−1)<br>b₀    b₀ | b₁ →⁻¹ b₁<br>b₀ →⁻¹ b₀ | b₁ ⤫ b₁<br>b₀ (−1) b₀ |
| 0=(k MOD 4) | 1=(k MOD 4) | 2=(k MOD 4) | 3=(k MOD 4) |

FIG.8 BIT VECTOR MANIPULATION ACCORDING TO ROTATION FACTORS FOR QPSK (INDEX 0=LSB):

| −j | −1 | j |
|---|---|---|
| b₁ ⤫ b₀<br>b₀ (−1) b₁ | b₁ →⁻¹ b₀<br>b₀ →⁻¹ b₁ | b₁ ⤫ b₀ (−1)<br>b₀    b₁ |

BIT VECTOR MANIPULATION ACCORDING TO ROTATION FACTORS FOR 16QAM (INDEX 0=LSB):

| −j | −1 | j |
|---|---|---|
| b3 b2 b1 b0<br>╳<br>b2 b3 b0 b1<br>(−1 on b2) | b3 b2 b1 b0<br>→ → → →<br>b3 b2 b1 b0<br>(−1 on b3, −1 on b2) | b3 b2 b1 b0<br>╳<br>b2 b3 b0 b1<br>(−1 on b3) |

FIG.9

BIT VECTOR MANIPULATION ACCORDING TO ROTATION FACTORS FOR 64QAM (INDEX 0=LSB):

| −j | −1 | j |
|---|---|---|
| b5 b4 b3 b2 b1 b0<br>╳ ╳<br>b4 b5 b2 b3 b0 b1<br>(−1 on b4) | b5 b4 b3 b2 b1 b0<br>→ → → → → →<br>b5 b4 b3 b2 b1 b0<br>(−1 on b5, −1 on b4) | b5 b4 b3 b2 b1 b0<br>╳ ╳<br>b4 b5 b2 b3 b0 b1<br>(−1 on b5) |

FREQUENCY DEPENDENT PHASE ROTATION PRIOR TO MAPPING IN AN OFDM TRANSMITTER

TECHNICAL FIELD

The exemplary and non-limiting embodiments of this invention relate generally to wireless communications systems and, more specifically, relate to OFDM transmissions and processing of transmission signals so as to insert cyclic prefixes with reduced latency and memory requirements.

BACKGROUND

Various abbreviations that appear in the specification and/or in the drawing figures are defined as follows:

| | |
|---|---|
| 3GPP | 3rd Generation Partnership Project |
| CP | cyclic prefix |
| DAC | digital to analog converter |
| DFT | discrete Fourier transform |
| FFT | fast Fourier transform |
| EUTRAN | evolved universal terrestrial radio access network (also LTE or 3.9G) |
| IEEE | institute of electrical and electronics engineers |
| IFFT | inverse Fast Fourier transform |
| LTE | long term evolution (3.9G) |
| MS | mobile station |
| OFDM | orthogonal frequency division multiplexing |
| OFDMA | orthogonal frequency division multiple access |
| RF | radio frequency |
| WiMAX | worldwide interoperability for microwave access |
| UMTS | universal mobile telecommunications system |
| UTRAN | UMTS terrestrial radio access network |

OFDM is a multi-carrier data transmission technique that is advantageously used in radio-frequency based transmitter-receiver systems, such as for example 3GPP EUTRAN/LTE/3.9G and to IEEE 802.16d/e/WiMAX, IEEE 802.11a/WiFi, fixed wireless access (FWA), HiperLAN2, digital audio and digital video broadcast (DAB and DVB), and others. OFDM systems typically divide available radio spectrum into many carriers. Each of the many carriers has a narrow bandwidth and is modulated with a low rate data stream. The carriers are closely spaced and orthogonal separation of the carriers controls inter-carrier interference (ICI).

When generating an OFDM signal, each carrier is assigned a data stream and the data streams are converted to symbols based on a modulation scheme such as for example Quadrature Amplitude Modulation (QAM and its variants 16QAM, 64QAM etc), Quadrature Phase Shift Key (QPSK), and the like. Once the phase and amplitude are determined, they must be converted to time domain signals for transmission. Typically, OFDM systems use an IFFT to perform this conversion. The IFFT is an efficient way of mapping the data onto the orthogonal carriers. The time domain signal is then up converted to RF of the appropriate carrier and transmitted.

Delay in processing that signal in the transmitter is a concern for several reasons. First, for the case where the user equipment UE/mobile station MS is transmitting the signal, the symbols must be received at the receiver/BS/NodeB within a certain window, which the BS assures by sending a timing advance to the various MSs in its cell. Second and relatedly, multi-path delay interference in the transmitted symbols causes inter-symbol interference (ISI) between the reflected radio signal and the direct radio signal. A cyclic prefix CP, of which the time it occupies is referred to as a guard interval GI, is inserted to separate the symbols and avoid ISI, but inserting the CP must be done so that the transmitted signal is sent with the proper timing advance. To achieve a reasonable throughput, the OFDM symbol duration may be at least five times the GI, and to avoid ICI the OFDM symbol is cyclically extended in the GI.

CP insertion may be achieved as follows. An IFFT has an associated "length" corresponding to a number of coefficients for the transform. The CP is generated by placing the last few IFFT output coefficients at the beginning of the symbol to form the CP. The size of the CP varies in different applications, and a common CP length is ¼ the length of the IFFT (e.g., for an IFFT with a length of 64, the output corresponding to the last 16 coefficients may be transmitted first as the cyclic prefix, and then the output corresponding to the 64 coefficients of the entire IFFT is output in regular order).

For the addition of this CP in known systems, the IFFT output requires relatively large buffers. If the output of the IFFT is in bit-reversed time order, then two buffers of size N (N is length of IFFT) are required. If the output of the IFFT is in time order, then a single buffer of the length of the IFFT (N) is required. Buffers add expense to the system.

Figure 1:
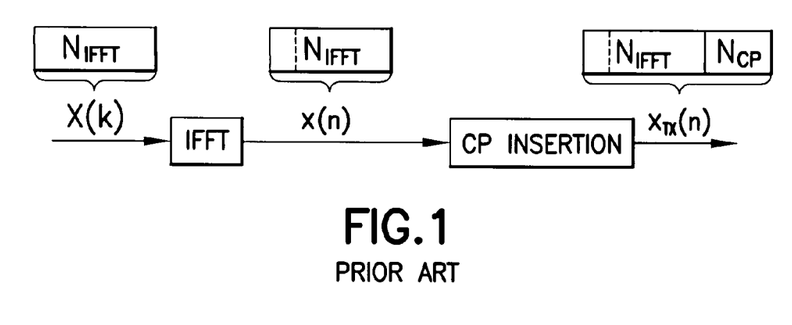
FIG. 1 shows a high-level schematic block diagram of a prior art transmitter IFFT section showing signal processing from the IFFT block to input a cyclic prefix.

So at the transmitter side of an OFDM system, a CP is introduced into the transmitter signal after the IFFT. As noted above, typically this CP consists of some few last samples of an OFDM symbol which follows the cycle prefix as is shown in FIG. 1, where $N_{IFFT}$ indicates the number of samples of the symbol and $N_{CP}$ indicates the number of samples in the portion corresponding to the CP. Because of that CP insertion, an additional memory is needed to store the first large part of the OFDM symbol until the beginning of the CP sequence.

Especially for long OFDM symbols as used in LTE systems (2048 FFT or 2048 IFFT) the memory consumption and delay is remarkable and should be reduced. Some approaches have used a combination of interleaving and FFT to reduce the latency and complexity of the OFDM based system, but while this strategy may be successfully used at the receiver, they are not seen to reduce latency at the OFDM transmitter. At the transmitter side, CP insertion significantly degrades this latency gain. Since the last part of the IFFT symbol is used for the CP, all or almost of the overall symbol ($N_{IFFT}$ samples) has to be stored after the IFFT process block. This buffering adds an unwanted and unnecessary delay to the output of the IFFT output.

Since the IFFT output has an unusable order, the input symbol stream of the IFFT has to be modified to get the wanted IFFT output order. Mathematically, this problem can be solved by a frequency dependent phase shift of the sub-carrier symbols as shown in equation 1 below:

$$e^{-j\frac{2\pi}{N_{IFFT}}kn_\tau}X(k) = \underbrace{\rho(kn_\tau)}_{Phase\,rotation}\;X(k) \xrightarrow{IFFT} x(n-n_\tau) \qquad [1]$$

In this equation, n denotes the time domain index and k denotes the frequency domain index. The IFFT output can be shifted by $n_\tau$ time samples. For our purpose, $n_\tau$ is equal to the number of IFFT samples (length $N_{IFFT}$) minus the number of cyclic prefix samples $N_{cp}$ ($n_\tau = N_{IFFT} - N_{cp}$).

There has been some prior art research into the above problem of CP insertion and latency at the transmitter. For example, US Pat. Publ. No. US 2004/0120413 A1 entitled Multi-carrier transmission systems and methods using sub-carrier relocation and guard interval insertion describes a multi-carrier transmission system which includes an encoder for converting a data sequence into encoded symbols corresponding to respective sub-carriers; a first shifter for rearranging the encoded symbols to define a guard interval length; an inverse fast Fourier transform (IFFT) unit for inverse fast Fourier transforming the rearranged encoded symbols; a second shifter for processing the transformed symbols to effect a frequency shift to compensate for a frequency shift effected by the IFFT unit; and a guard interval inserter for interleaving symbol replicas with the processed symbols according to the guard interval length.

Another reference relevant to the problem at hand is International Publication No. WO 2007/123340 A2, entitled Method and apparatus for inserting guard interval in a mobile communication system. This reference describes rotating a phase of each symbol for a stream, converting the phase rotated symbol stream into a time domain symbol stream, and copying a rear part of the time domain stream to a front part of the time domain stream and/or vice versa.

Another somewhat similar approach is seen as US Pat. Publ. No. US 2005/0047325 A1, entitled: Combined inverse fast Fourier transform and guard interval processing for efficient implementation of OFDM based systems. This document details an IFFT circuit that receives input data of length N coefficients and generates output data of length N coefficients that are circularly shifted by m coefficients. A CP insertion circuit inserts a CP of length m and includes a first switch connected to the IFFT circuit, a buffer of length m having an input connected to the first switch and an output, and a second switch, coupled to the first switch and to the buffer. The first and second switches selectively couple the output of the buffer and the IFFT circuit to an output of the second switch.

SUMMARY

According to an embodiment of the invention is a method that includes providing an input bit stream, re-ordering bits of the input bit stream, mapping the re-ordered bit stream to a symbol of a signal constellation, converting the mapped symbol to the time domain as an ordered set of N samples, and outputting the ordered set of samples followed by a first portion of the ordered set of samples for transmission.

According to another embodiment of the invention is an apparatus that includes an input node configured to provide an input bit stream, bit stream modifier block configured to re-order bits of an input bit stream, a symbol mapper, an inverse Fourier transform block, a buffer and a multiplexer. The symbol mapper is configured to map the re-ordered input bit stream to a symbol of a signal constellation and the inverse Fourier transform block is configured to convert the mapped symbol to the time domain as an ordered set of N samples. The buffer is configured to store a first portion of the ordered set of N samples output from the inverse Fourier transform block. And the multiplexer is configured to output the ordered set of N samples from the inverse Fourier transform block followed by the stored first portion of the ordered set of N samples for transmission.

According to another embodiment of the invention is a computer readable memory embodying a program of machine-readable instructions executable by a digital data processor to perform actions directed toward producing a time domain set of samples in a particular order. According to this embodiment, the actions include providing an input bit stream, re-ordering the input bit stream, mapping the re-ordered bit stream to a symbol of a signal constellation, converting the mapped symbol to the time domain as an ordered set of N samples, storing a first portion of the ordered set of N samples in a buffer, and outputting the ordered set of N samples followed by the first portion of the ordered set of N samples for transmission.

According to another embodiment of the invention is an apparatus that has means for re-ordering bits of an input bit stream, means for mapping the re-ordered input bit stream to a symbol of a signal constellation, and means for converting the mapped symbol to the time domain as an ordered set of N samples. In an exemplary embodiment the means for mapping is a signal constellation mapper and the means for converting is an inverse fast Fourier transform block. The means for re-ordering operates to apply a phase rotation selected from the group $\{1, -j, -1, j\}$, where $j=\sqrt{-1}$. Further, this embodiment of the apparatus has means for storing a first portion of the ordered set of N samples, which is a buffer that has a length at least as long as the first portion of the ordered set of N samples. This embodiment of the apparatus also has means for outputting the stored first portion of the ordered set of N samples in sequence after the full ordered set of N samples, and in a particular embodiment this means for outputting is a multiplexer that has parallel inputs from the buffer and from the inverse fast Fourier transform block.

DETAILED DESCRIPTION

One common aspect that a reviewer might notice in each of the three prior art patent publications referenced particularly above is that in each of them the phase rotation occurs after the symbol mapping and prior to the IFFT transformation. In US Pat. Publ. No. US 2005/0047325, the signal rotation is combined with the IFFT transform. Embodiments of this invention take a fundamentally different approach. The output of the IFFT may still be identical to that given by equation

[1], but an embodiment of these teachings efficiently removes the delay that is inherent in inserting the CP according to the teachings of any of those three publications. Specifically, embodiments of this invention re-order the bit stream that is input to the IFFT in order to get an output that does not need to be fully buffered. In particular, the bit stream is modified before symbol mapping to the signal constellation, and so the input to the IFFT is in the proper order so that the output is, in sequence, the CP part of the OFDM symbol followed by the remainder of the OFDM symbol. Whereas the prior art noted above performs a phase shift at the constellation symbol level, embodiments of this invention facilitate the CP insertion by manipulating the bit sequence at the bit stream level by swapping bit pairs and inverting bits prior to mapping to the symbol constellation. Then the output from the IFFT is arranged so as to efficiently place the CP in the proper sequence with the OFDM symbol. Using the N-based terminology above for the samples, the IFFT block outputs the $N_{CP}$ samples and (immediately) thereafter outputs the remaining $N_{IFFT}-N_{CP}$ samples, which puts the whole number of samples in the proper order. The $N_{CP}$ samples are stored at a buffer for re-insertion at the tail end of the $N_{IFFT}$ samples by means of a multiplexer that takes as the inputs it multiplexes the output $N_{IFFT}$ of the IFFT block and the output of the buffer of length $N_{CP}$ that stores the $N_{CP}$ samples. This implementation requires a fairly small buffer and no or quite minimal processing delay.

Figure 3:
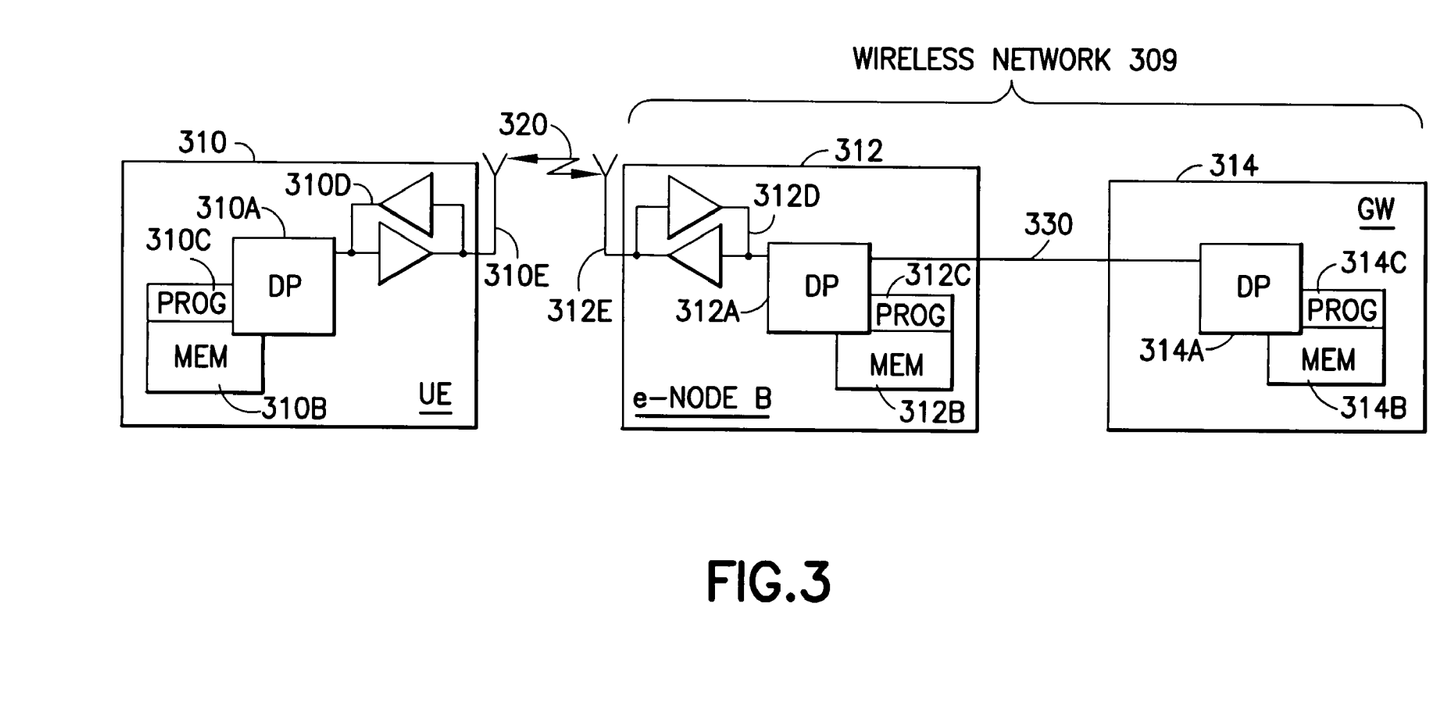
FIG. 3 is a schematic block diagram showing various apparatus in which embodiments of the invention may be disposed and an environment in which they operate.

Before detailing more specific embodiments and variations of those embodiments, reference is first made to FIG. 3 for illustrating a simplified block diagram of various electronic devices that are suitable for use in practicing the exemplary embodiments of this invention. In FIG. 3 a wireless network 309 is adapted for wireless communication with a user equipment UE 310 (which may be fixed or mobile as known in various networks 309) via a base station 312 (also termed in some networks a node B or e-node B, or more generally an access node or access point). It is noted that the UE 310 does not form a part of the network 309 (even in relay networks that use an MS to relay to/from another MS or other network nodes such as fixed relay stations); the network provides service/access to the UE 310. The network 309 may include a serving radio network controller RNC 314 or other radio controller function known by various terms in different wireless communication systems (e.g., mobility management entity MME, gateway, etc.). The UE 310 includes a data processor (DP) 310A, a memory (MEM) 310B that stores a program (PROG) 310C, and a suitable radio frequency (RF) transceiver 310D coupled to one or more antennas 310E (one shown) for bidirectional wireless communications over one or more wireless links 320 with the BS/node B 312. The UE 310 synchronizes its transmissions and functions with reference to a clock (not separately shown), which is typically disposed on the DP 310A and slaved to reference timing signals sent from the BS/node B 312 over the wireless link 320. The UE 310 also uses its clock to control sampling and decimation frequency as well as transmit and receive instances.

The BS/node B 312 also includes a DP 312A with a local clock, and a MEM 312B that stores a PROG 312C. The BS/node B 312 also includes a suitable RF transceiver 312D (e.g., combined transmitter and receiver) coupled to one or more antennas 312E, typically arranged as an array of antennas. The RNC/MME 314 also has a DP 314A and a MEM 314B that stores a PROG 314C, and is coupled over a data link 330 such as an Iub link to the BS/node B 312 though in some instances it may be a wireless link. The RNC/MME 314 includes a suitable modem and/or transceiver (not shown) as the case may be for communication over that data link 330.

For the case where the RNC/MME 314 has only a wired connection 330 with the BS 312, the RNC/GW may not have a transmitter and may not need to implement these teachings. For the case where it does, the RNC/GW 314 also includes a wireless transceiver substantially similar to that of the BS 312. For simplicity of explanation, it will be assumed the UE 310 is the transmitter and the BS 312 is the receiver of a particular communication, though those positions may be readily reversed in practice.

At least one of the PROGs 310C, 312C and preferably in both of the memories 310B, 312B is assumed to include program instructions that, when executed by the associated DP, enable the electronic device to operate in accordance with the exemplary embodiments of this invention, as detailed further below.

The PROGs 310C, 312C may be embodied in software, firmware and/or hardware, as is appropriate. In general, the exemplary embodiments of this invention may be implemented by computer software stored in the MEM 310B, 312B and executable by the DP 310A, 312A of the UE 310 and the BS 312 within which it lies, and similar for the other MEMs and DPs of the RNC/GW 314, or by hardware, or by a combination of software and/or firmware and hardware in any or all of the devices shown.

In general, the various embodiments of the MS 310, 312 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 310B, 312B and 314B may be of any type suitable to the local technical environment and may be implemented using any suitable data storage technology, such as semiconductor-based memory devices, magnetic memory devices and systems, optical memory devices and systems, fixed memory and removable memory. The DPs 310A, 312A and 314A may be of any type suitable to the local technical environment, and may include one or more of general purpose computers, special purpose computers, microprocessors, digital signal processors (DSPs) and processors based on a multi-core processor architecture, as non-limiting examples.

Having described the environment and appropriate hardware/software for implementing the various embodiments of the invention, now those embodiments are detailed with specificity. Relevant distinctions over the prior art are evident by comparing the block diagram of FIG. 4A to its companion at FIG. 4B, the latter showing an embodiment of the invention. The term IFFT is used to refer to any inverse Fourier transform, whether fast, discrete, or otherwise.

Each of FIGS. 4A-4D show one stream being input to the IFFT block, though as is well known in the art there may be a serial-to-parallel converter between the symbol mapper and the IFFT block so that multiple stream may be processed in parallel, with a companion parallel to serial converter between the IFFT block and the transit antenna(s) to recombine the streams for interim processing (e.g., filtering, digital to analog conversion, RF upconversion, amplification, etc.) as is generally shown at FIG. 3A of WO 2007/123340 and also implied at FIG. 3 of US 2004/0120413. FIGS. 4A-4D show symbol/constellation mapping or modulation (e.g., PSK, 16QAM) at the illustrated mappers; mapping the OFDM symbols to subcarriers is performed downstream of the illustrated components as is known in the art for OFDM transmitters.

Figure 4A:
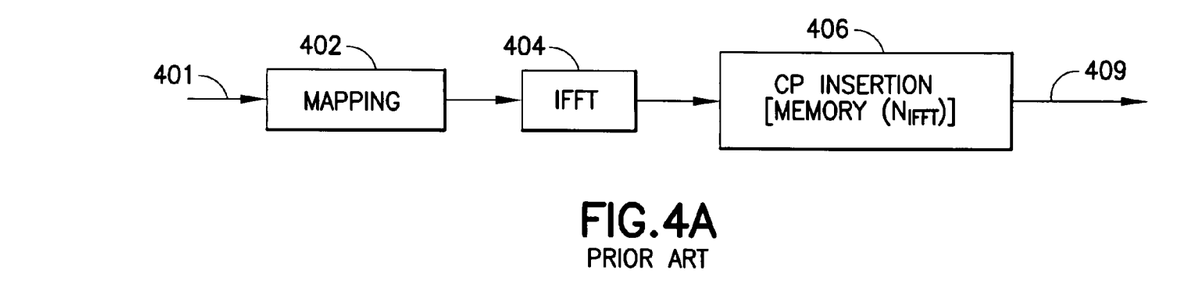
FIG. 4A is a prior art adaptation of FIG. 1 to show particular distinctions within FIG. 4B.

First FIG. 4A is described as representative of a generic prior art approach to cyclic prefix insertion. The bit stream is input 401 to the symbol mapper 402 and mapped to a symbol of the signal constellation. The constellation symbol is then transformed from the frequency domain to the time domain at the IFFT block 404 which outputs the OFDM symbol in the time domain as a series of length $N_{IFFT}$ samples, the CP is inserted at the buffer 406 and output 409 as a cyclic prefix in the proper order after the full OFDM symbol $N_{IFFT}$ for filtering, upconversion, amplification and eventual transmission.

Figure 4B:
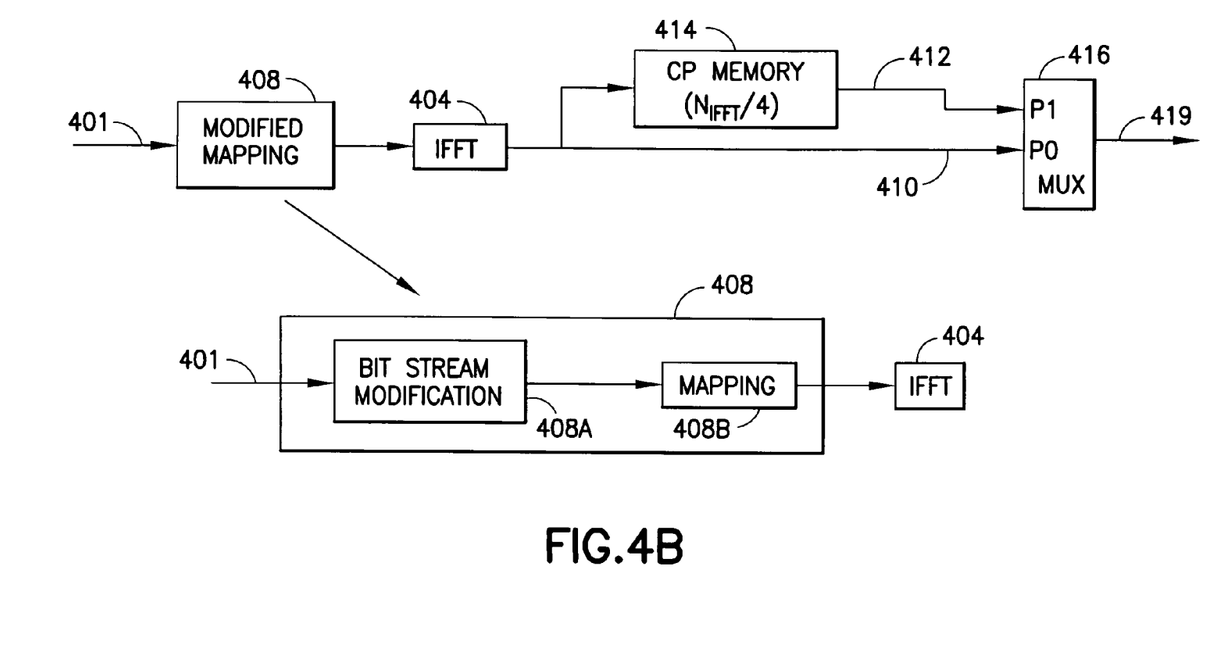
FIG. 4B is a block diagram showing processing through the IFFT and CP insertion according to an embodiment of the invention.

Now consider FIG. 4B. The identical bit stream input 401 input into a modified symbol mapper 408 which is shown generally as having a bit stream modifier block 408A and a mapping block 408B. The mapping block 408B may be identical to the constellation mapper 402 of FIG. 4A, but the bit stream modification 408A re-orders the bits that are mapped to the signal constellation at the mapper 402 as compared to the order that the input bit stream is mapped in FIG. 4A. The output of the mapper 408 of FIG. 4B is such that the phase modified constellation symbols (done at the bit level) that are input to the IFFT block 404 is in the proper order at the IFFT output port and there is no need to store the entire $N_{IFFT}$ samples so as to re-order them for CP insertion; the output of the IFFT has the $N_{CP}$ samples leading the entire sequence of $N_{IFFT}$ samples for that single OFDM symbol. In this regard the internal workings of the IFFT block 404 are identical as between FIGS. 4A and 4B; it is their input that differs which produces the different output by which processing time and buffering is saved. At FIG. 4B for an individual OFDM symbol, the IFFT outputs a string of $N_{IFFT}$ samples. A number $N_{CP}$ samples form a first portion of that string. That leading or first portion of the samples $N_{CP}$ is stored at the buffer 414, while the entire stream $N_{IFFT}$ of the properly-ordered samples from the IFFT block 404 of FIG. 4B are output on a direct line 410 and though a first port P0 of a multiplexer 416. The output $N_{IFFT}$ samples which include the $N_{CP}$ samples followed by the remaining ones of the $N_{IFFT}$ samples for a single OFDM symbol. Downstream there may be a serial to parallel conversion prior to these samples passing to the RF transmitter front end (filtering, upconversion, amplification) for transmission. Then the multiplexer switches to accept at the second port P1 an input from the buffer, which is that same first portion $N_{CP}$ of the samples that led the $N_{IFFT}$ samples already output. By switching input ports the multiplexer 416 appends the $N_{CP}$ samples to the tail end of the full set of $N_{IFFT}$ samples for that OFDM symbol. Those tail-appended $N_{CP}$ samples are the cyclic prefix for the $N_{IFFT}$ samples, but because the first portion $N_{CP}$ of the full $N_{IFFT}$ samples was in the proper order as output from the IFFT, only that first portion need be stored and so the buffer is much shorter than that of FIG. 4A.

The output of the multiplexer 419 for each OFDM symbol is then $N_{CP}$ samples following the $N_{IFFT}$ samples, where the same number $N_{CP}$ samples are at the leading and the trailing end of the train of length $N_{CP}+N_{IFFT}$. The outputs 409, 419 are identical, but the buffer 414 is shorter in FIG. 4B than that 406 of FIG. 4A, and so processing delay and power requirements are reduced. For completeness, FIG. 4B shows the line 412 through the buffer as being in parallel with the direct line 410 from the IFFT to the multiplexer 416. Various switching arrangements can be used in place of the multiplexer 416 to obtain the same result.

In FIG. 4B, the bit stream 401 is modified at block 408A before the symbol mapping at block 408B. Then the output of the IFFT block 404 starts with the CP part of the OFDM symbol, which due to the bit stream modifying is the first portion $N_{CP}$ of the set of $N_{IFFT}$ samples. This part is sent to the next processing block (via the multiplexer 416 first port P0) and is also stored in parallel at the buffer 414. Note that for cases where $N_{cp}<\frac{1}{4} N_{IFFT}$, the first non-CP samples ($\frac{1}{4}N_{IFFT}-N_{cp}$) are stored and because of this the example of FIG. 4B does impose some minimal delay of ($\frac{1}{4}N_{IFFT}-N_{cp}$) samples for those cases where the length of the actual CP being processed does not exactly match the optimum-design length of the physical buffer 414. Regardless, one can see that the concept illustrated by FIG. 4B results in a smaller memory usage and no delay or a much smaller delay as compared to the conventional solution represented at FIG. 4A.

Figure 4C:
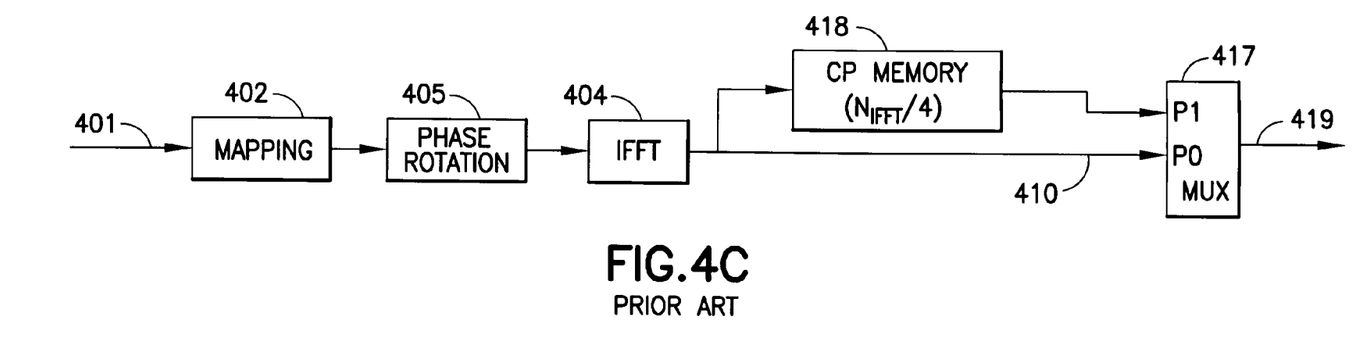
FIGS. 4C and 4D are prior art variations.
Figure 4D:
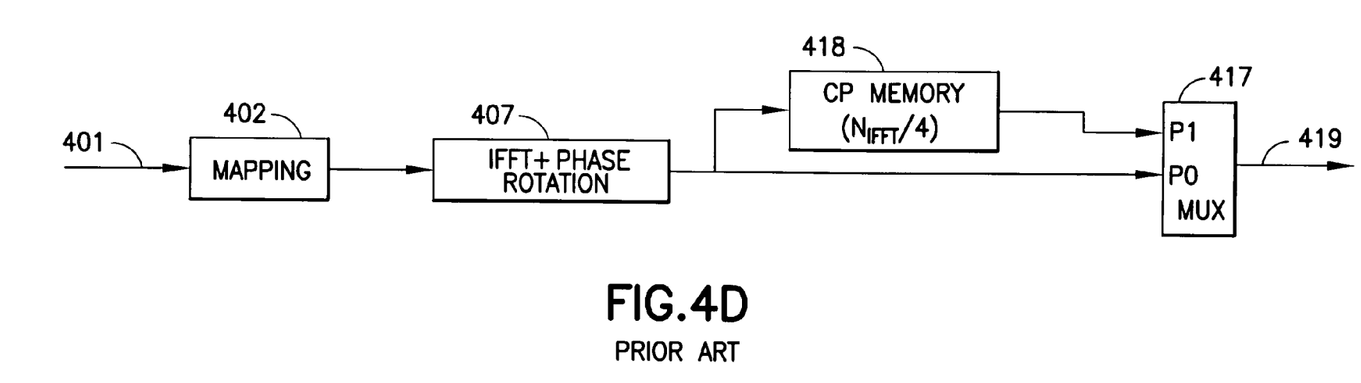

FIGS. 4C and 4D illustrate for comparison purposes what the inventors consider as consistent with the teachings of the prior art references noted above. FIG. 4C uses a phase rotator 405 disposed between the constellation mapper 402 and the IFFT block 404. It also uses a short buffer 418 which can be multiplexed 417 with a direct output of the IFFT 404. The phase rotation 405 assures that the output of the IFFT is in the proper order, and it is done after the symbol mapping of block 402 and prior to the IFFT block 404. This is seen to be consistent with the approach of US Pat. Publ. No. US 2004/0120413 A1 (FIG. 10 and [0059]) and of International Publication No. WO 2007/123340 A2. FIG. 4D combines the phase rotation function with the IFFT function at the combined IFFT/phase rotation block 407, and is seen to be consistent with US Pat. Publ. No. US 2005/0047325 A1. FIG. 4D also uses a short buffer 418. But for each of FIGS. 4C-4D, the phase rotation that enables that short buffer by assuring the samples output from the IFFT are in the proper order for efficient CP insertion is done at the symbol level, after symbol mapping 402. FIG. 4B does the necessary manipulation at the bit level, prior to the bits being mapped 408B to the symbol constellation.

The needed modified mapping is a simple bit stream re-ordering and a bit inversion before the symbol mapping which results from the following equation [2]. Based on a cyclic prefix length ¼ OFDM symbol length ($N_{FFT}=N_{IFFT}$) and the FFT structure, equation [1] can be rewritten as $$x\left(n - \frac{3N_{IFFT}}{4}\right) \xrightarrow{FFT} e^{-j\frac{2\pi}{N_{IFFT}}k\frac{3N_{IFFT}}{4}} X(k) = e^{-j\frac{3\pi}{2}k} X(k) \quad [2]$$

For that reason, the frequency dependent phase rotation factor is as follows $$k = 0,1,2,3,4 \ldots N_{FFT}: f(e^{-j\frac{3\pi}{2}k}): 1, -j, -1, j, 1 \ldots \quad [3]$$

As one can see from equation [3], this rotation factor function has trivial multiplication values 1, −j, −1 or j only. For that reason, it is simple to incorporate re-ordering of the input bit stream 401 described with reference to FIG. 4B into the symbol-mapping process itself at blocks 408A and 408B for even more efficient processing than the symbol level phase rotations of FIG. 4C (or 4D).

The bit re-ordering before the symbol mapping process at FIG. 4B performs a rotation at the bit stream level. Re-ordering/rotating the bits and symbol mapping those re-ordered/rotated bits as in FIG. 4B yields the same input to the IFFT as symbol mapping the original input bit stream 401 and rotating the mapped symbol as in FIG. 4C. Each of FIGS. 4B, 4C and 4D output the same set of $N_{IFFT}$ samples in the same order.

Figure 5:
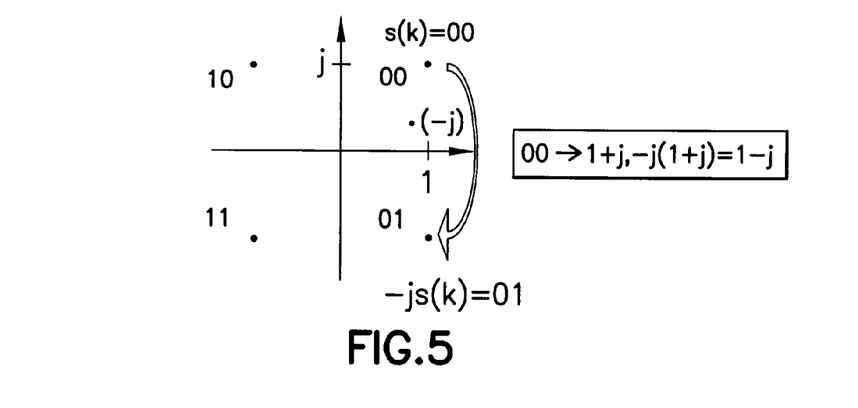
FIG. 5 is a signal constellation showing rotations after mapping according to an embodiment of the invention.

But bit-level manipulation is somewhat more efficient than symbol rotation and so processing capacity and time is saved by embodiments of this invention as compared to FIGS. 4C-4D. FIG. 5 is an illustration of the rotation which is done after the symbol mapping process. In that example, the bit vector '00' is mapped to '1+j' (00➔1+j) and rotated by '−j' (−j(1+j)=1−j) to get the needed phase shift.

Figure 6:
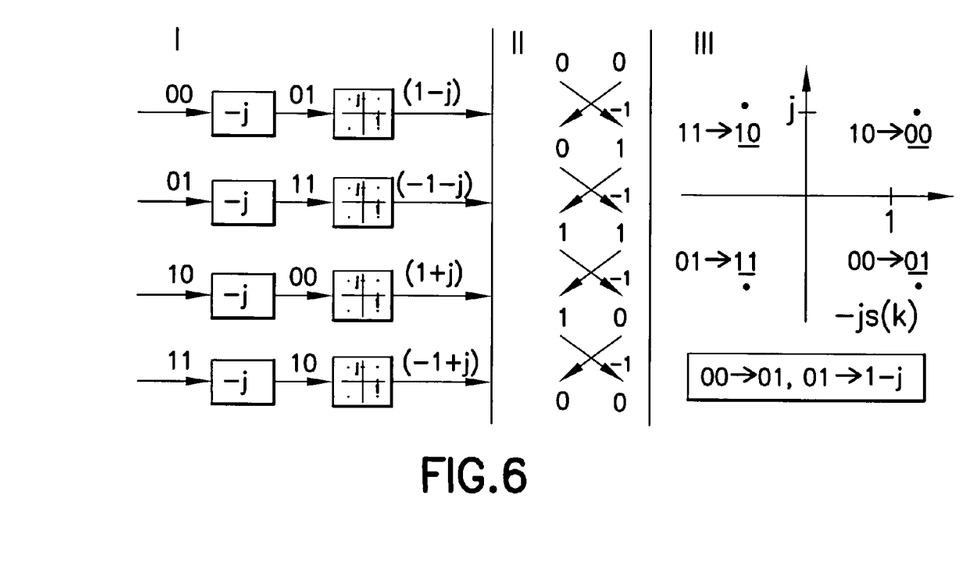
FIG. 6 is a tabular format of bit-pair swapping and single-bit inverting in two equivalent columns according to embodiments of the present invention, and constellation rotation in a third equivalent column to show results comparable to FIG. 5.

FIG. 6 illustrates the concept of these teachings for the same example. The first column, denoted 'I', shows the overview of the pre-processing and mapping for all possible bit vectors for QPSK modulation/symbol mapping. The middle column, denoted 'II', shows the bit vector rotation. As can be seen, this rotation process is a simple bit swapping and inversion or negation (symbolized by '−1') of the second bit after the swapping. The last column, denoted 'III', illustrates the same example as above showing in the symbol constellation rotation form. Note that this type of rotation (at the bit level prior to symbol mapping) has a lower complexity than a symbol rotation after the mapping.

Figure 2:
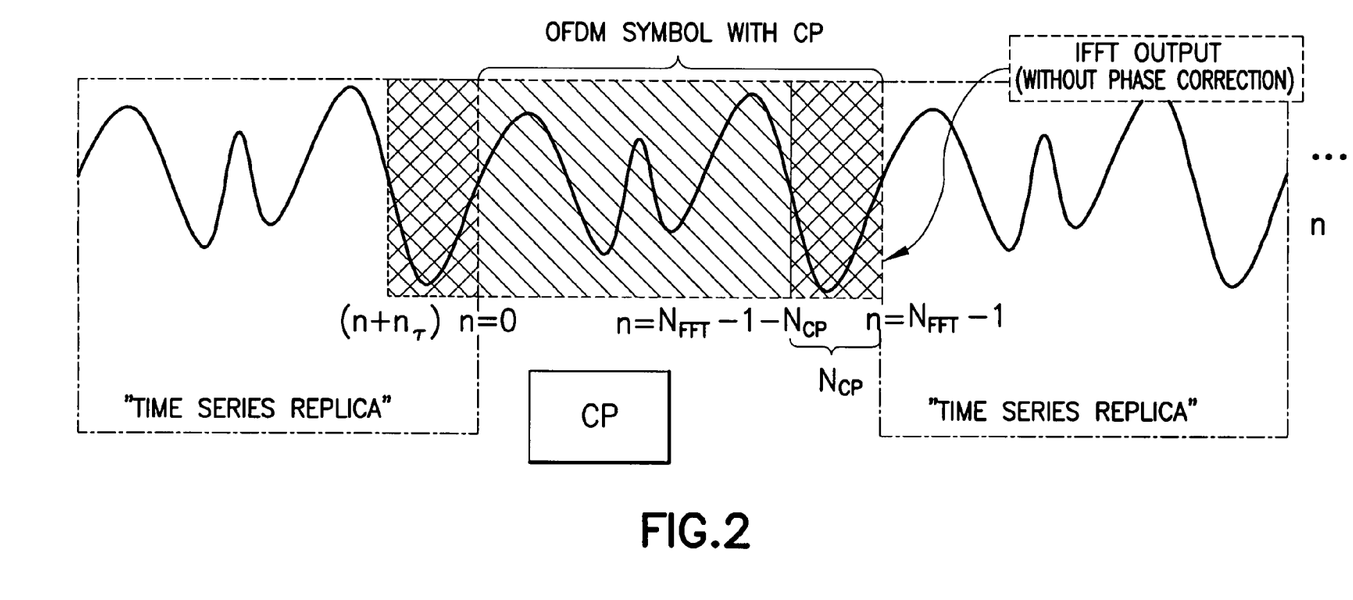
FIG. 2 is a stylized diagram showing relation between the IFFT output x(n) and the cyclic prefix based on the theoretical Fourier concept.
Figure 7:
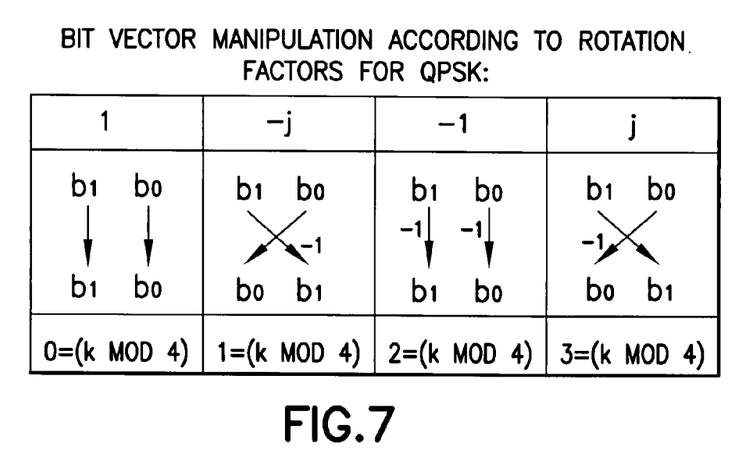
FIG. 7 is a table showing bit-pair swapping and single-bit inversion according to the four rotation factors using QPSK modulation.

To realize all trivial rotation, bit vector manipulations as shown in FIG. 7 are used sequentially for the bit pairs $b_1$ and $b_0$ according to the sub-carrier index k. Consequently, 1 for k=0,4,8, etc., −j for k=1,5,9, etc. −1 for k=2,6,10, etc. and j for k=3,7,11, etc. This phase rotation strategy allows the time shift of the time domain sequence (IFFT output) to the beginning of the cycle prefix sequence, which is additionally stored to be also sent at the end of the IFFT symbol as can be seen at FIG. 2 and in hardware at FIG. 4B.

$$e^{-j\frac{3\pi}{2}k}X(k) = \underbrace{\rho(k \bmod 4)X(k)}_{Phase\,rotation} \xrightarrow{IFFT} x\left(n - \frac{3N_{IFFT}}{4}\right)$$

For the special case where the ratio of CP to OFDM symbol length ($N_{IFFT}$) is equal to ¼, then the result is the simple case where the phase rotation factors are 1, −j, −1 and j. Such a ratio is used for the long CP lengths of the LTE system. See for example 3GPP TR 25.814 v7.1.0 (2006-09), "Physical layer Aspects for evolved Universal Terrestrial Access (UTRA) (Release 7)" at section 7.1.1. The table below is drawn from that section and adapted for these teachings where the CP length is set equal to ¼ OFDM symbol length. Note that even if the CP length is smaller than ¼ this time-shift strategy results in some reduction of memory and latency as noted above with regard to the description of FIG. 4B. In the case where the ratio CP to OFDM length is less than ¼, the non-CP samples of the last ¼ OFDM symbols (¼$N_{IFFT}$−$N_{cp}$) are stored until the beginning of the real CP. This leads to a smaller delay as compared to the conventional strategy shown generally at FIG. 4A.

TABLE 1

CP lengths in LTE (3GPP TR 25.814).

| Band | | 1.25 MHz | 2.5 MHz | 5 MHz | 10 MHz | 15 MHz | 20 MHz |
|---|---|---|---|---|---|---|---|
| CP length (samples) | Short | (9) × 6, (10) × 1* | (18) × 6, (20) × 1 | (36) × 6, (40) × 1 | (72) × 6, (80) × 1 | (108) × 6, (120) × 1 | (144) × 6, (160) × 1 |
| | Long | (32) | (64) | (128) | (256) | (384) | (512) |

Figure 8:
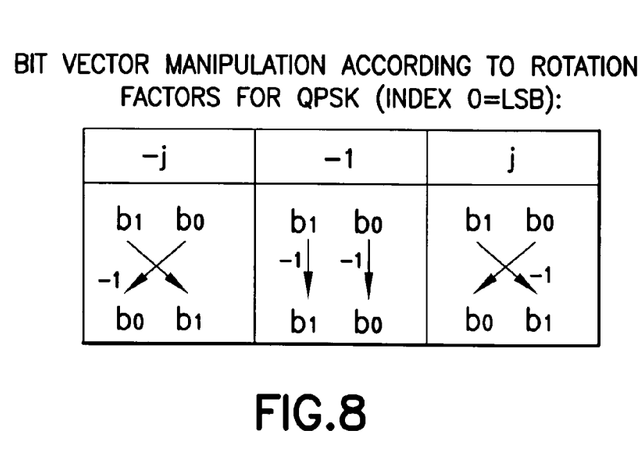
FIG. 8 is similar to FIG. 7 but showing only the three rotation factors that generate a net change to the resulting bit pair.
Figure 9:
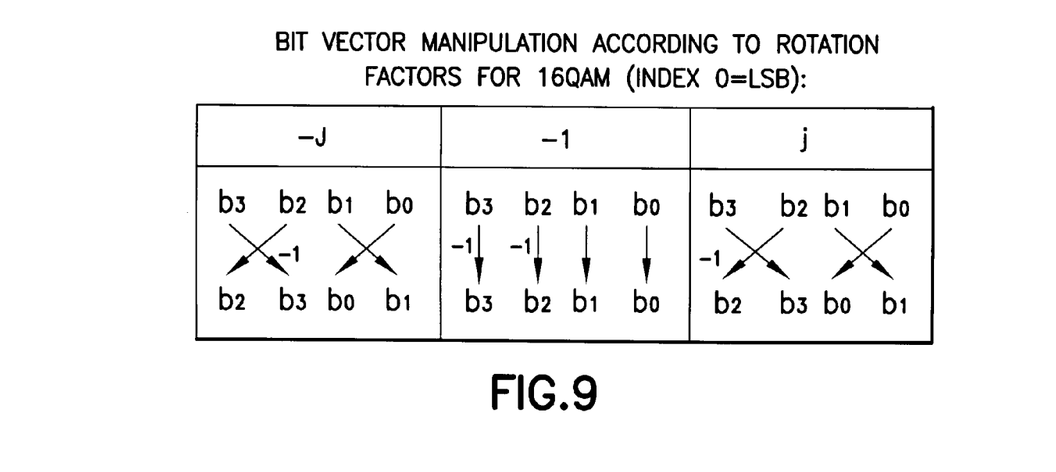
FIG. 9 is similar to FIG. 8 but for 16QAM modulation.
Figure 10:
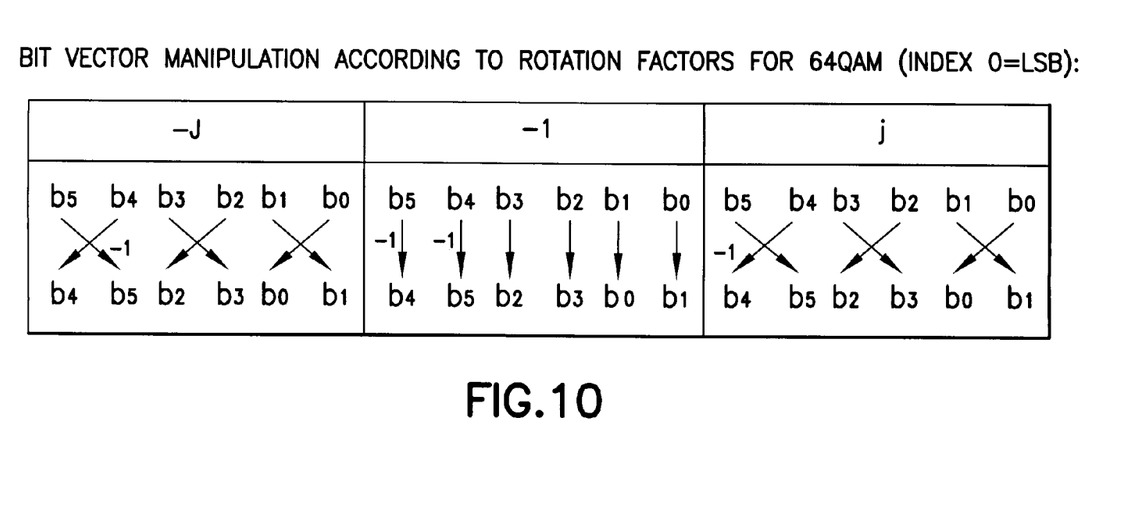
FIG. 10 is similar to FIG. 8 but for 64QAM modulation.

*{(y1) × n1, (y2) × n2} means (y1) for n1 OFDM symbols and (y2) for n2 OFDM symbols FIGS. 8, 9 and 10 illustrate the bit level rotations ideas based on the trivial rotation factors −j, −1 and j. Note the rotation factor 1 does not change the bit vector and therefore is not shown in those Figures. Specifically, FIG. 8 is for QPSK modulation, FIG. 9 is for 16QAM modulation, and FIG. 10 is for 64QAM modulation, where for each case the bit vector element with index zero is assumed to the least significant bit LSB. Note that the bit swapping can be also combined with the processing before the bit stream modification 408A shown in FIG. 4B, such as for example combined with interleaving that is done prior to symbol mapping 408B. There are many process blocks in which the bit swapping may be readily imposed.

According to embodiments of this invention then is an apparatus, a computer readable memory storing a program, and a method in which a bit stream is provided, positions of bits among at least one pair of the bit stream are swapped (reversed) and one of the swapped bits is inverted, and thereafter the bit stream with the swapped and inverted bit pair is mapped to a symbol, an inverse Fourier transform is executed on the mapped symbol, a first portion ($N_{CP}$) of the transformed symbol ($N_{IFFT}$) is stored and appended to a tail end of the transformed symbol via a multiplexer so as to result in an output having the first portion ($N_{CP}$) following the transformed symbol ($N_{IFFT}$). That output is then transmitted (with additional processing prior to transmission, such as mapping to OFDM subcarriers). In a particular embodiment the bit swapping and the symbol-mapping are combined as phase rotating the bit stream pair by a trivial phase rotation in an amount selected from the group {1, −j, −1, j} while mapping. In still another embodiment the phase rotation of bit pairs of the stream are according to the order given in that group.

Figure 11:
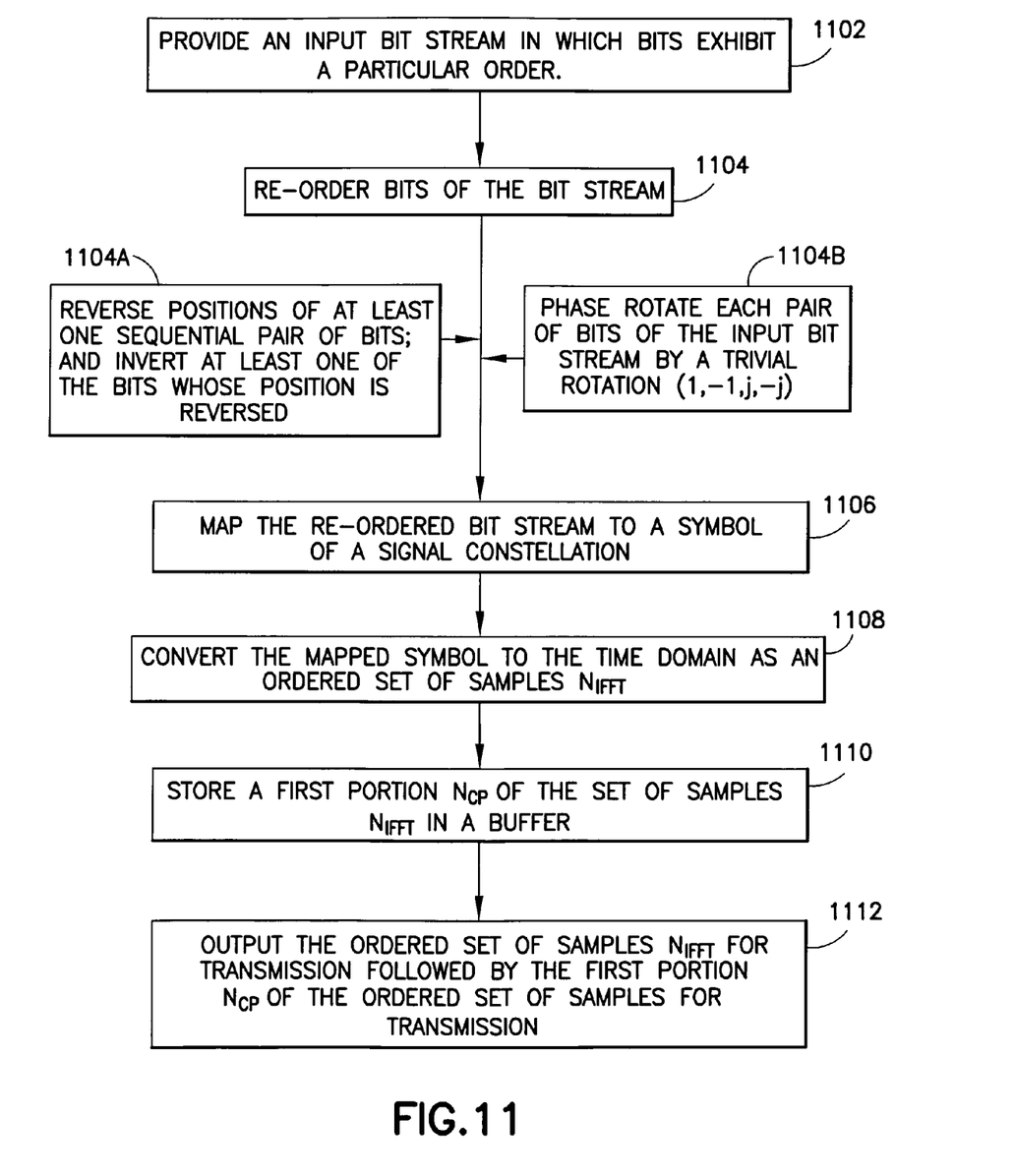
FIG. 11 is a process flow diagram showing some exemplary embodiments of the invention.

FIG. 11 shows process steps according to an embodiment of the invention. At block 1102 an input bit stream is provided. The input bit stream 401 exhibits a particular order in which it is input. At block 1104 that input bit stream is re-ordered and at block 1106 the re-ordered bit stream is mapped to a symbol of a signal constellation. At block 1108 the mapped symbol is converted to the time domain (IFFT block 404) as an ordered set of samples $N_{IFFT}$. At block 1110 the first portion $N_{CP}$ of the set of samples $N_{IFFT}$ is stored in a buffer 414. And at block 1112 the ordered set of samples $N_{IFFT}$ is output for transmission followed by the first portion $N_{CP}$ of the ordered set of samples.

Block 1104 is broken into the two different variations to show the different concepts of implementation detailed above. At block 1104A the positions of bits of the input bit stream are re-ordered by reversing positions of at least one sequential pair of bits of the input bit stream and inverting at least one of the bits whose position is reversed, as seen at FIG. 6 and at least some of the j/−j rotations of FIGS. 7-10, and by the bit stream modifier 408A. At block 1104B the bits are re-ordered by phase rotating each pair of bits of the input bit stream by a trivial rotation (1, −1, j, −j), also as performed by the bit stream modifier 408A.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. For example, selected ones of the blocks of FIG. 11 may represent distinct circuitry functions of an integrated circuit or chipset.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
providing an input bit stream;
re-ordering bits of the input bit stream by phase rotating sequential pairs of bits of the input bit stream;
mapping the re-ordered bit stream to a symbol of a signal constellation;
converting the mapped symbol to the time domain as an ordered set of N samples; and
outputting the ordered set of N samples followed by a first portion of the ordered set of N samples for transmission.

2. The method of claim 1, wherein converting the mapped symbol to the time domain comprises performing an inverse fast Fourier transform to generate the ordered set of N samples, where the ordered set of N samples is an integer number $N_{IFFT}$ that represents an orthogonal frequency division multiplexing OFDM symbol and the first portion of the ordered set of N samples is an integer number $N_{CP}$ that represents a cyclic prefix of the OFDM symbol.

3. The method of claim 2, wherein the first portion of the ordered set is stored in a buffer of length $N_{CP}$.

4. The method of claim 2, further comprising transmitting the OFDM symbol followed by the cyclic prefix.

5. The method of claim 1, wherein phase rotating is by a trivial phase rotation selected from the group $\{1, -j, -1, j\}$ according to sub-carrier index i=(k mod 4), where $j=\sqrt{-1}$.

6. The method of claim 1, wherein outputting the ordered set of N samples followed by the first portion of the ordered set of N samples for transmission comprises:
in parallel, outputting the first portion of the ordered set of N samples for transmission and storing the first portion of the ordered set of N samples in a buffer;
and then outputting a remaining portion of the ordered set of N samples for transmission;
and then outputting from the buffer the stored first portion of the ordered set of N samples for transmission.

7. The method of claim 6, wherein the first portion of the ordered set of N samples are $N_{CP}$ samples, $N_{CP}$ is less than or equal to ¼*N, and the buffer is at most length $N_{CP}$.

8. An apparatus comprising:
a bit stream modifier block configured to, re-order bits of an input bit stream by phase rotating sequential pairs of bits of the input bit stream;
a symbol mapper configured to map the re-ordered input bit stream to a symbol of a signal constellation;
an inverse Fourier transform block configured to convert the mapped symbol to the time domain as an ordered set of N samples;
a buffer configured to store a first portion of the ordered set of N samples output from the inverse Fourier transform block; and
a switch configured to output the ordered set of N samples from the inverse Fourier transform block followed by the stored first portion of the ordered set of N samples for transmission.

9. The apparatus of claim 8, wherein the inverse Fourier transform block outputs the ordered set of N samples, where the ordered set of N samples is an integer number $N_{IFFT}$ that represents an orthogonal frequency division multiplexing OFDM symbol and the first portion of the ordered set of N samples is an integer number $N_{CP}$ that represents a cyclic prefix of the OFDM symbol.

10. The apparatus of claim 9, wherein the buffer is length $N_{CP}$.

11. The apparatus of claim 9, wherein the apparatus comprises a transmitter that is configured to transmit the OFDM symbol followed by the cyclic prefix.

12. The apparatus of claim 8, wherein the bit stream modifier block is configured to rotate phase by a trivial phase rotation selected from the group $\{1, -j, -1, j\}$ according to sub-carrier index i=(k mod 4), where $j=\sqrt{-1}$.

13. The apparatus of claim 12, wherein the bit stream modifier block and the symbol mapper are combined to a single hardware block.

14. The apparatus of claim 8, wherein the switch comprises a multiplexer and further wherein the buffer and the multiplexer are configured such that an output of the inverse Fourier transform block is coupled to a first input port of the multiplexer and an output of the buffer is coupled to a second input port of the multiplexer.

15. The apparatus of claim 14, wherein the apparatus comprises an OFDM transmitter.

16. A computer readable memory embodying a program of machine-readable instructions executable by a digital data processor to perform actions comprising:
providing an input bit stream;
re-ordering bits of the input bit stream by phase rotating sequential pairs of bits of the input bit stream;
mapping the re-ordered bit stream to a symbol of a signal constellation;
converting the mapped symbol to the time domain as an ordered set of N samples; and
outputting the ordered set of N samples followed by a first portion of the ordered set of N samples for transmission.

17. The computer readable memory of claim 16, wherein converting the mapped symbol to the time domain comprises performing an inverse fast Fourier transform to generate the ordered set of N samples, where the ordered set of N samples is an integer number $N_{IFFT}$ that represents an orthogonal frequency division multiplexing OFDM symbol and the first portion of the ordered set of N samples is an integer number $N_{CP}$ that represents a cyclic prefix of the OFDM symbol.

18. The computer readable memory of claim 17, wherein the first portion of the ordered set of N samples is stored in a buffer of length $N_{CP}$.

19. The computer readable memory of claim 17, further comprising transmitting the OFDM symbol followed by the cyclic prefix.

20. The computer readable memory of claim 16, wherein phase rotating is by a trivial phase rotation selected from the group $\{1, -j, -1, j\}$ according sub-carrier index i=(k mod 4), where $j=\sqrt{-1}$.

21. The computer readable memory of claim 16, wherein outputting the ordered set of N samples followed by the first portion of the ordered set of N samples for transmission comprises:
   in parallel, outputting the first portion of the ordered set of N samples for transmission and storing the first portion of the ordered set of N samples in a buffer;
   and then outputting a remaining portion of the ordered set of N samples for transmission;
   and then outputting from the buffer the stored first portion of the ordered set of N samples for transmission.

22. The computer readable memory of claim 21, wherein the first portion of the ordered set of N samples are $N_{CP}$ samples, $N_{CP}$ is less than or equal to ¼*N, and the buffer is at most length $N_{CP}$.

23. An apparatus comprising:
   means for re-ordering bits of an input bit stream comprising a bit stream modifier that applies a phase rotation to each bit pair of the bit stream;
   means for mapping the re-ordered bit stream to a symbol of a signal constellation;
   means for converting the mapped symbol to the time domain as an ordered set of N samples;
   means for storing a first portion of the ordered set of N samples; and
   means for outputting the stored first portion of the ordered set of N samples in sequence after the ordered set of N samples.

24. The apparatus of claim 23, wherein:
   the bit stream modifier applies a phase rotation to each bit pair of the bit stream, the phase rotation selected from the group $\{1, -j, -1, j\}$ according to sub-carrier index i=(k mod 4), where $j=\sqrt{-1}$;
   the means for mapping comprises a signal constellation mapper;
   the means for converting comprises an inverse fast Fourier transform block;
   the means for storing comprises a buffer at least the length of the first portion of the ordered set of N samples; and
   the means for outputting comprises a multiplexer having parallel inputs from the buffer and the inverse fast Fourier transform block.

* * * * *